(12) United States Patent
Daley

(10) Patent No.: US 10,942,100 B2
(45) Date of Patent: Mar. 9, 2021

(54) FIXED DISPLACEMENT HYDRAULIC ACTUATOR DISCONNECT

(71) Applicant: Sealed Air Corporation (US), Charlotte, NC (US)

(72) Inventor: Bradley N. Daley, Inman, SC (US)

(73) Assignee: Sealed Air Corporation (US), Charlotte, NC (US)

( * ) Notice: Subject to any disclaimer, the term of this patent is extended or adjusted under 35 U.S.C. 154(b) by 228 days.

(21) Appl. No.: 16/078,657

(22) PCT Filed: Mar. 27, 2017

(86) PCT No.: PCT/US2017/024284
§ 371 (c)(1),
(2) Date: Aug. 22, 2018

(87) PCT Pub. No.: WO2017/180316
PCT Pub. Date: Oct. 19, 2017

(65) Prior Publication Data
US 2019/0064042 A1 Feb. 28, 2019

Related U.S. Application Data

(60) Provisional application No. 62/321,315, filed on Apr. 12, 2016.

(51) Int. Cl.
*G01N 3/10* (2006.01)
*B30B 15/28* (2006.01)
*G01N 3/08* (2006.01)

(52) U.S. Cl.
CPC ............. *G01N 3/10* (2013.01); *B30B 15/281* (2013.01); *G01N 3/08* (2013.01);
(Continued)

(58) Field of Classification Search
CPC .... G01N 3/10; G01N 3/08; G01N 2203/0012; G01N 2203/0019; G01N 2203/0048; B30B 15/281
See application file for complete search history.

(56) References Cited

U.S. PATENT DOCUMENTS 2,259,257 A 10/1941 James
2,563,296 A 8/1951 White et al.
(Continued)

FOREIGN PATENT DOCUMENTS

| DE | 1127308 B | 4/1962 |
| EP | 0118946 A2 | 9/1984 |
| GB | 191423815 A | 7/1915 |

OTHER PUBLICATIONS

Written Opinion of the International Searching Authority in International Application No. PCT/2017/024284, dated Oct. 19, 2017.

*Primary Examiner* — Suman K Nath
(74) *Attorney, Agent, or Firm* — Jon M. Isaacson

(57) ABSTRACT

A shaft decoupling system (200) includes an inner shaft (202) couplable to an actuator (102), an outer shaft (204) aligned coaxially with the inner shaft, and a bearing release collar (206). The bearing release collar is biased toward a first position by a biasing mechanism and configured to be moved to a second position against a biasing force of the biasing mechanism (222, 322) in response to the bearing release collar contacting a collar strike plate (118) as the actuator moves the shaft decoupling system. When the bearing release collar is in the first position, a bearing (220, 320) is held by the bearing release collar to prevent respective movement of the inner shaft and the outer shaft. When the bearing release collar is in the second position, the bearing release collar permits the bearing to retract such that the inner shaft is permitted to move coaxially with respect to the outer shaft.

20 Claims, 12 Drawing Sheets

(52) U.S. Cl.
CPC ........... *G01N 2203/0012* (2013.01); *G01N 2203/0019* (2013.01); *G01N 2203/0048* (2013.01)

(56) References Cited

U.S. PATENT DOCUMENTS

| | | | |
|---|---|---|---|
| 2,594,520 A | 4/1952 | Tiedman | |
| 4,586,248 A | 5/1986 | Ho | |
| 2010/0224038 A1* | 9/2010 | Evatt | B25B 23/12 81/429 |
| 2012/0045534 A1* | 2/2012 | Lindee | A23P 30/10 425/256 |
| 2013/0282027 A1* | 10/2013 | Woodard, Jr. | A61B 17/0625 606/144 |
| 2016/0216182 A1* | 7/2016 | Zhao | G01N 3/22 |

\* cited by examiner

FIXED DISPLACEMENT HYDRAULIC ACTUATOR DISCONNECT

BACKGROUND

The present disclosure is in the technical field of compression testing of materials. More particularly, the present disclosure is directed to test system that allows for repeatable compression testing at a substantially constant rate to a particular depth.

Compressing testing is accomplished by an actuator, such as a hydraulic, mechanical, or magnetic actuator, extending a cylinder into a specimen. In some instances, the specimen is compression tested by the cylinder being extended at a substantially constant rate to a certain depth into the specimen. In order to maintain a substantially constant rate of the compression of the specimen, the cylinder comes to an abrupt stop when the particular compression depth is met.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a shaft decoupling system includes an inner shaft couplable to an actuator, an outer shaft aligned coaxially with the inner shaft, and a bearing release collar. The bearing release collar is biased toward a first position by a biasing mechanism and configured to be moved to a second position against a biasing force of the biasing mechanism in response to the bearing release collar contacting a collar strike plate as the actuator moves the shaft decoupling system. When the bearing release collar is in the first position, a bearing is held by the bearing release collar to prevent respective movement of the inner shaft and the outer shaft. When the bearing release collar is in the second position, the bearing release collar permits the bearing to retract such that the inner shaft is permitted to move coaxially with respect to the outer shaft.

In one example, the bearing comprises a plurality of bearings having substantially linear inner and outer surfaces. In another example, the shaft decoupling system further includes a bearing retention collar fixedly coupled to the outer shaft and configured to hold the plurality of bearings between the bearing release collar and the inner shaft. In another example, the shaft decoupling system further includes a guide fastened to an end of the inner shaft such that the guide is located within the outer shaft. In another example, the guide has an outer diameter that is larger than an inner diameter of the bearing retention collar. In another example, the inner shaft has an outer sleeve that includes a plurality of flat surfaces. In another example, the outer sleeve includes a bearing cavity on each of the plurality of flat surfaces. In another example, wherein the bearing cavity is a groove around a perimeter of the outer sleeve.

In another example, the shaft decoupling system further includes a biasing retention cap fixedly coupled to the outer shaft such that the biasing mechanism is retained between the biasing retention cap and the bearing retention collar. In another example, the biasing retention cap and the biasing mechanism are located coaxially around at least one of a portion of the outer shaft and a portion of the inner shaft. In another example, the biasing mechanism includes a plurality of biasing mechanisms and the biasing retention cap is configured to retain the plurality of biasing mechanisms between the biasing retention cap and the bearing retention collar.

In another example, the bearing comprises a plurality of bearings. In another example, the plurality of bearings includes one or more of a ball bearing, a sleeve bearing, a rod bearing, or a roller bearing. In another example, the outer shaft is coupled to a bearing retaining collar that comprises a plurality of holes configured to retain the plurality of ball bearings. In another example, the inner shaft comprises an outer sleeve that includes a bearing cavity configured to be aligned with the plurality of holes in the bearing retaining collar when the bearing release collar is in the first position.

In another embodiment, a test system includes a driven shaft couplable to an actuator, a shaft decoupling system, and a collar strike plate. The shaft decoupling system includes an inner shaft coupled to the driven shaft, an outer shaft aligned coaxially with the inner shaft, and a bearing release collar. The bearing release collar is biased toward a first position by a biasing mechanism and configured to be moved to a second position. When the bearing release collar is in the first position, a bearing is held by the bearing release collar to prevent respective movement of the inner shaft and the outer shaft. When the bearing release collar is in the second position, the bearing release collar permits the bearing to retract such that the inner shaft is permitted to move coaxially with respect to the outer shaft. The collar strike plate is positioned above a testing area. The collar strike plate includes a hole arranged such that, as the actuator moves the driven shaft and the shaft decoupling system, the outer shaft is permitted to pass through the hole and the bearing release collar contacts the collar strike plate and move the bearing release collar from the first position to the second position.

In one example, the test system further includes adjustable height components between a base of the test system and the collar strike plate, where the adjustable height components are configured to be adjusted to set a distance from the base to the collar strike plate. In another example, the test system of further includes at least two guide rails extending through the adjustable legs and the collar strike plate. In another example, the test system further includes a guide bar fixedly coupled to the driven shaft and to the inner shaft, wherein the guide bar is configured to glide along the at least two guide rails as the actuator moves the driven shaft. In another example, the test system further includes the actuator. In another example, the actuator and the driven shaft are coupled via a shear pin.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
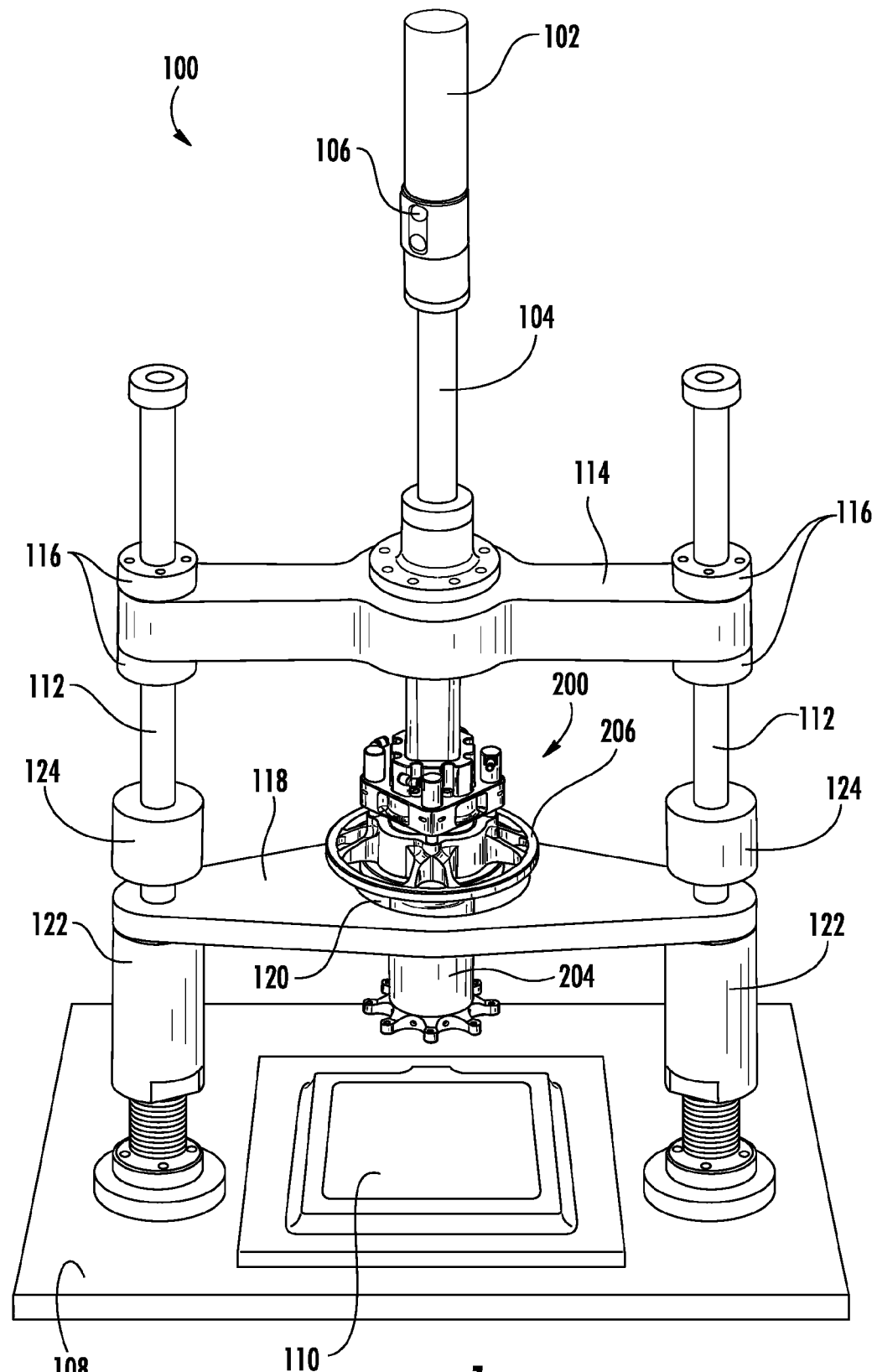
FIG. 1 depicts an embodiment of a test system with an embodiment of a shaft decoupling system, in accordance with the embodiments disclosed herein.
Figure 2:
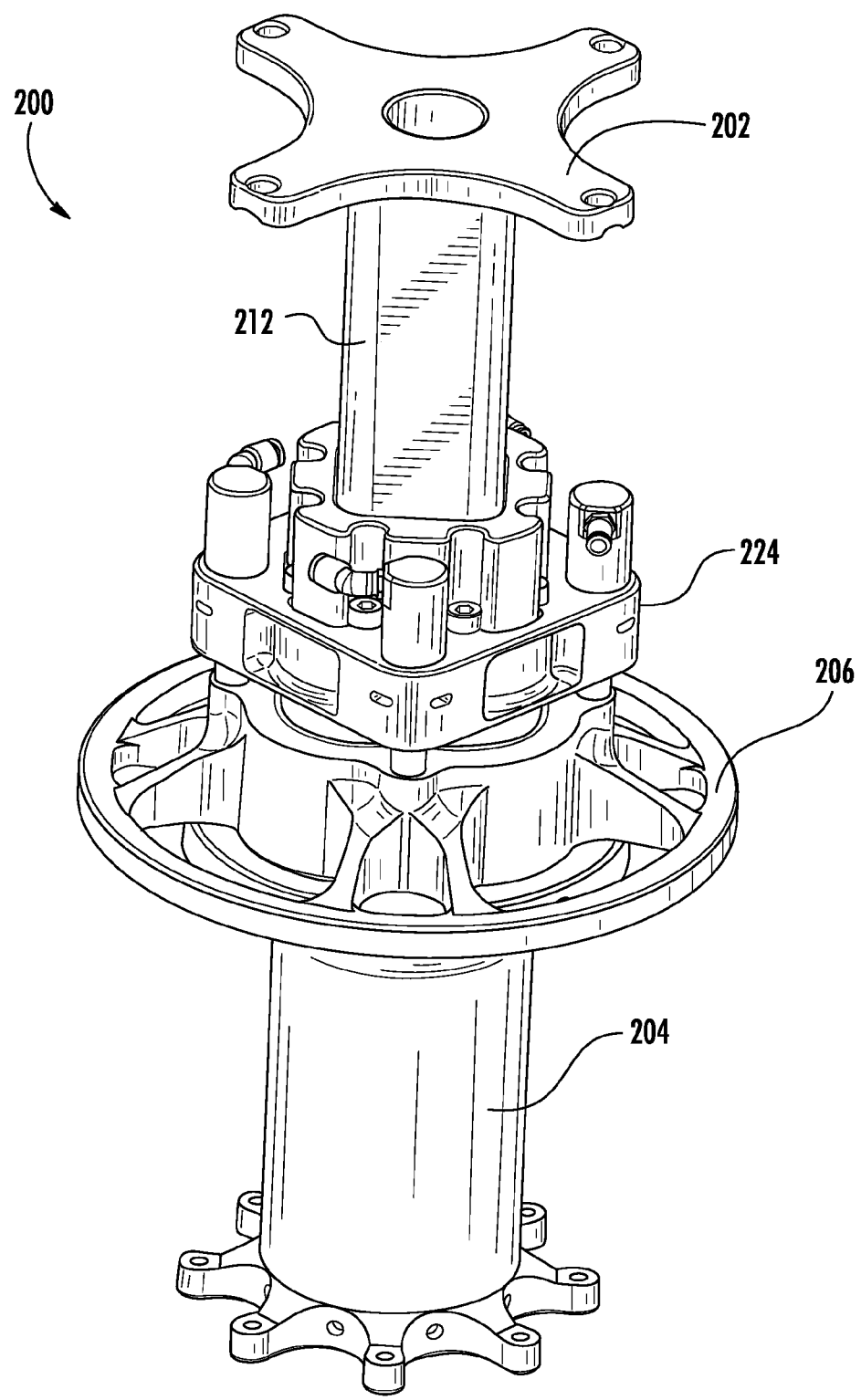
FIG. 2 depicts a perspective view of the embodiment of the shaft decoupling system depicted in FIG. 1, in accordance with the embodiments disclosed herein.

The present disclosure describes embodiments of shaft decoupling systems that allows compression testing at high actuator rates while reducing physical damage to the test system from sudden stopping at the end of the compression test. In conventional testing systems, the specimen is contacted by an impact assembly. The impact assembly is coupled to an actuator, such as a hydraulic actuator, using a shear pin. In some compression testing, the impact assembly is configured to be extended a particular distance into the specimen. In order to prevent the impact assembly from extending further into the specimen than intended, mechanical stops are placed to stop the movement of the impact assembly. The actuator can then extend the impact assembly down to the mechanical stops to compression test the specimen.

High actuator rates are in a range of rates greater than or equal to about 0.1 m/s. In some embodiments, the compression testing occurs at rates of 0.3 m/s, 0.5 m/s, 1.0 m/s, 4.0 m/s, 20 m/s, or any other rate. At some actuator rates, such as rates less than or equal to about 1.0 m/s, the actuator is capable of employing a closed-loop feedback system to control the rate at which the actuator is extended during a compression test and how far the actuator extends. However, at some rates, such as at rates of greater than about 1.0 m/s, the motion of the actuator is too fast to allow for control of the actuator using a closed-loop feedback system. Without the ability to control motion using a closed-loop feedback system, the actuator speed and distance cannot be controlled as precisely.

Another difficulty with compression testing that uses mechanical stops is the damage caused to the testing system with the impact assembly impacts the mechanical stops. When the actuator drives the compression test at a high actuator rate and mechanical stops are used stop the motion of the impact assembly, the force used to drive the actuator for the compression test is typically sufficient to shear the shear pin when the impact assembly impacts the mechanical stops. The shearing of the shear pin can damage one or both of the actuator or the impact assembly. When the shear pin shears, the shear pin typically has sharp edges that dig into the actuator or the impact assembly. After a number of tests under these conditions (e.g., 5-10 tests), the actuator and the impact assembly can become wedged together, requiring the use of tools (e.g., hammer, vice) to separate the actuator from the impact assembly.

Repairing damage done by shear pin breakage can be time consuming and delay testing of additional specimens. Replacing the shear pin itself can take several minutes. If the actuator and the impact assembly are wedged together, it takes additional time to separate the actuator and the impact assembly before the shear pin can be replaced. In more extreme cases, the damage cause by the broken shear pin can require machining of the actuator and/or the impact assembly (e.g., filing off gouge marks, using a lathe to refinish bores of impact assemblies, etc.), which takes even more time. Avoiding the time and expense of repairing damage from shear pin breakage would increase the efficiency of specimen testing and decrease the cost associated with specimen testing. Disclosed herein are embodiments of shaft decoupling systems used in compression test systems to prevent shearing the shear pins between actuators and impact assemblies.

One embodiment of a test system 100 with an embodiment of a shaft decoupling system 200 is depicted in FIG. 1. The shaft decoupling system 200 is depicted in greater detail in FIGS. 2-6. The test system 100 includes an actuator 102. In FIG. 1, a portion of the actuator 102 is depicted as the end of a piston. In some embodiments, the actuator 102 is driven by hydraulics, by mechanical force, by magnetic force, or in any other manner. In some embodiments, the actuator 102 includes other components that are not depicted in FIG. 1, such as a hydraulic fluid system, an electric motor, and the like.

The actuator 102 is coupled to a driven shaft 104 via a shear pin 106. The shear pin 106 fixedly couples the actuator 102 to the driven shaft 104 such that movements of the actuator 102 cause movement of the driven shaft 104. As used herein, the term "fixedly coupled" means that items are coupled in a way that does not permit relative movement of the items, such as coupled by fasteners (e.g., screws, bolts, rivets, etc.), by welds, by adhesive, or in any other manner. Two items that are fixedly coupled can be separated to allow respective movement, sometimes with the use of tools (e.g., removing a screw or a bolt using a screwdriver).

The test system 100 includes a base 108 that includes a specimen testing area 110. The driven shaft 104 is aligned with the specimen testing area 110 such that a specimen can be placed on the specimen testing area 110 to be compression tested by movements of the actuator 102. In the particular embodiment shown in FIG. 1, the test system 100 includes two guide rails 112 that extend up from the base 108. The test system 100 includes a guide bar 114 that is fixedly coupled to the driven shaft 104. The guide bar 114 is configured to glide along the two guide rails 112. In the depicted embodiment, bearings 116 aid the guide bar 114 in gliding along the guide rails 112. The guide rails 112 and the guide bar 114 aid in directing the motion from the actuator 102 through the driven shaft 104 in the proper direction.

In the particular embodiment shown in FIG. 1, the test system 100 includes a collar strike plate 118. The collar strike plate 118 includes a hole 120 aligned with the specimen testing area 110. In the depicted embodiment, the guide rails 112 extend through the collar strike plate 118. The test system 100 also includes adjustable height components 122 that are configured to hold the collar strike plate 118 at a particular distance away from the base 108. In the depicted embodiment, the adjustable height components 122 have internal threads that engage external threads near the base of the guide rails 112 and the position of the adjustable height components 122 is adjustable by rotating the adjustable height components 122. The test system 100 also includes mechanical stops 124 located on the guide rails 112. In some embodiments, the mechanical stops 124 are positioned to provide a hard stop for the guide rail 114 or the bearings 116 to hit before the bottom of the shaft decoupling system 200 hits any portion of the base 108.

In the embodiment depicted in FIG. 1, a portion of the shaft decoupling system 200 is fixedly coupled to the guide bar 114. The shaft decoupling system 200 is also depicted in greater detail in FIGS. 2-3. The shaft decoupling system 200 includes an inner shaft 202 that is configured to be fixedly coupled to the actuator 102. In the embodiment depicted in FIG. 1, the inner shaft 202 is fixedly coupled to the actuator 102 via the guide bar 114 and the driven shaft 104. The shaft decoupling system 200 also includes an outer shaft 204 and a bearing release collar 206. The outer shaft 204 is aligned coaxially with the inner shaft 202. As shown in FIG. 1, the outer shaft 204 is capable of passing through the hole 120 in the collar strike plate 118, but the bearing release collar 206 has a diameter larger than the hole 120 so that the bearing release collar 206 will contact the collar strike plate 118 if the shaft decoupling system 200 is moved downward to that point. This interaction of the bearing release collar 206 and the collar strike plate 118 will be further discussed below with respect to FIGS. 4-6.

In some embodiments, the shaft decoupling system 200 includes a guide 208 configured to be fixedly coupled to the lower end of the inner shaft 202 via a fastener 210. In the depicted embodiment, the fastener 210 is a threaded rod that engages inner threads on the inner shaft 202 and inner threads on the guide 208. In some embodiments, the fastener 210 is configured to dampen vibration such that any vibration of the guide 208 or the outer shaft 204 is dampened as it is transmitted to the inner shaft 202 via the fastener 210. The guide 208 is configured to fit inside of and move within the outer shaft 204. The guide 208 has an outer diameter that is equal to or smaller than the inner diameter of the outer shaft.

In some embodiments, the inner shaft 202 and the outer shaft 204 are configured to withstand forces of about 100 kN or greater to prevent deformation during compression testing. In some embodiments, the inner shaft 202 and the outer shaft 204 are configured to withstand forces of about 200 kN or greater. In some embodiments, the guide 208 is made from a material (e.g., brass, bronze, polytetrafluoroethylene, plastic, etc.) that is softer than the material of the outer shaft 204 (e.g., aluminum, steel, etc.). This allows the guide 208 to deform more readily than the outer shaft 204 so that the guide 208 is more likely to be damaged than the outer shaft 204. This is particularly helpful if the guide 208 is cheaper and more easily replaced than the outer shaft 204 in the event that guide 208 is damaged. Forming the guide 208 from a softer material than the outer shaft 204 may also improve the ability of the guide 208 to slide along the outer shaft 204.

Figure 3:
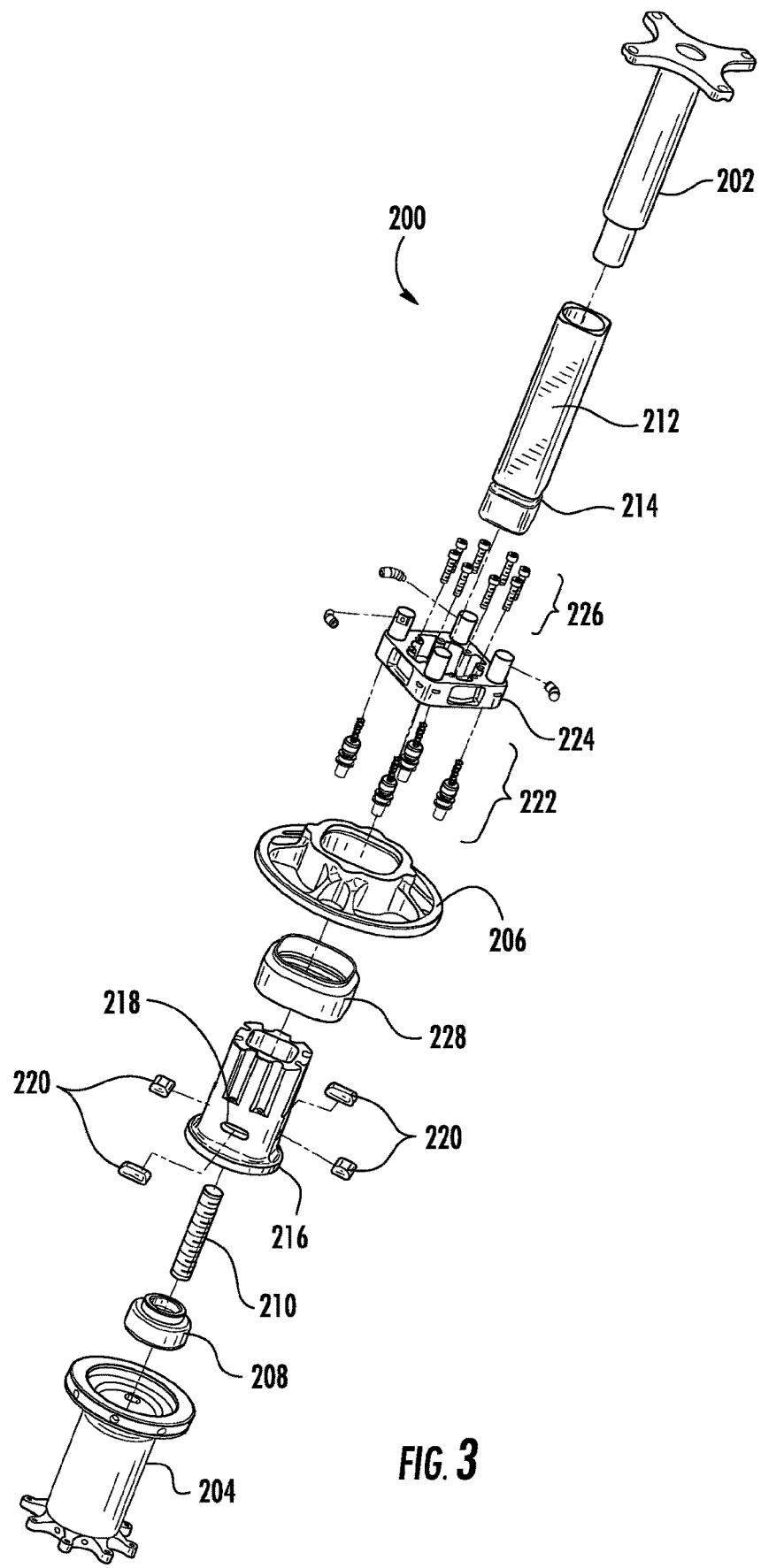
FIG. 3 depicts an exploded view of the embodiment of the shaft decoupling system depicted in FIG. 1, in accordance with the embodiments disclosed herein.

In the embodiment depicted in FIG. 3, an outer sleeve 212 is configured to be located around the outside of the inner shaft 202. In some embodiments, the outer sleeve 212 is configured to be fixedly coupled to the inner shaft 202, such as by press fit, by welding, by adhesive, or by any other means. In other embodiments, such as in the embodiment depicted in FIGS. 3-6, the outer sleeve 212 is fixedly coupled to the inner shaft 202 by the guide 208 being forced against the outer sleeve 212 as it is fastened to the inner shaft 202 by the fastener 210. The outer sleeve 212 includes a bearing cavity 214. In the embodiment depicted in FIGS. 3-6, the bearing cavity 214 is in the form of a groove around the perimeter of the outer sleeve 212.

In some embodiments, the shaft decoupling system 200 includes a bearing retention collar 216 configured to be fixedly coupled to the outer shaft 204. The bearing retention collar 216 includes bearing holes 218 configured to retain bearings 220. The sides of the bearings 220 facing the inside of the bearing retention collar 216 are configured to contact the bearing cavity 214. The sides of the bearings 220 facing the outside of the bearing retention collar 216 are configured to contact a bearing contact surface 228. In the embodiment depicted in FIGS. 3-6, the bearing contact surface 228 is separate from the bearing release collar 206 and configured to be fixedly coupled to the bearing contact surface 228. However, in other embodiments, the bearing contact surface 228 is formed as a portion of the bearing release collar 206.

In the embodiments shown in FIGS. 3-6, the bearings 220 have substantially linear inner faces (i.e., the faces that are toward the outer sleeve 212) and substantially linear outer faces (i.e., the faces that are toward the bearing contact surface 228. The substantially linear inner and outer faces permit any force on the bearings 220 to be distributed across a larger surface than other bearings, such as ball bearing. This reduces the possibility of causing damage from the inner faces of bearings 220 to the bearing cavity 214, from the outer faces of bearings 220 to the bearing contact surface 228, or from the bearings 220 to any other component of the shaft decoupling system 200. In the depicted embodiment, the outer sleeve 212 has four flat surfaces corresponding to the four bearings 220. The flat surfaces of the outer sleeve 212 allow the substantially linear inner faces of the bearings 220 to properly engage the bearing cavity 214. The bearing cavity 214 is located on each of the flat surfaces. In the depicted embodiment, the bearing cavity 214 is a groove around a perimeter of the outer sleeve 212. In other embodiments, the bearing cavity 214 includes separate cavities (e.g., one cavity on each of the flat surfaces of the outer sleeve 212). Because the bearings 220 have substantially linear inner and outer surfaces, the bearings 220 have a width that avoids rotation of the bearings 220 as they translate within the bearing holes 218 and, therefore, prevents wedging of the bearings 220 in the bearing holes 218.

The shaft decoupling system 200 includes a biasing mechanism 222 configured to bias the bearing release collar 206 to a first position. In the embodiment depicted in FIG. 3, the biasing mechanism 222 includes four individual biasing mechanisms. In the depicted embodiment, the biasing mechanism is in the form of compression springs; however, any other type of biasing member could be used, such as a compressible elastomer, a torsional spring, and the like. While the biasing mechanism 222 in the depicted embodiment includes four individual biasing mechanisms, the biasing mechanism 222 may include any number of individual biasing mechanisms (i.e., one or more individual biasing mechanisms). The shaft decoupling system 200 also includes a biasing retention cap 224. The biasing retention cap 224 is configured to be fixedly coupled to the bearing retention collar 216. In the embodiment depicted in FIG. 3, the biasing retention cap 224 is configured to be fixedly coupled to the bearing retention collar 216 by fasteners 226.

Figure 4:
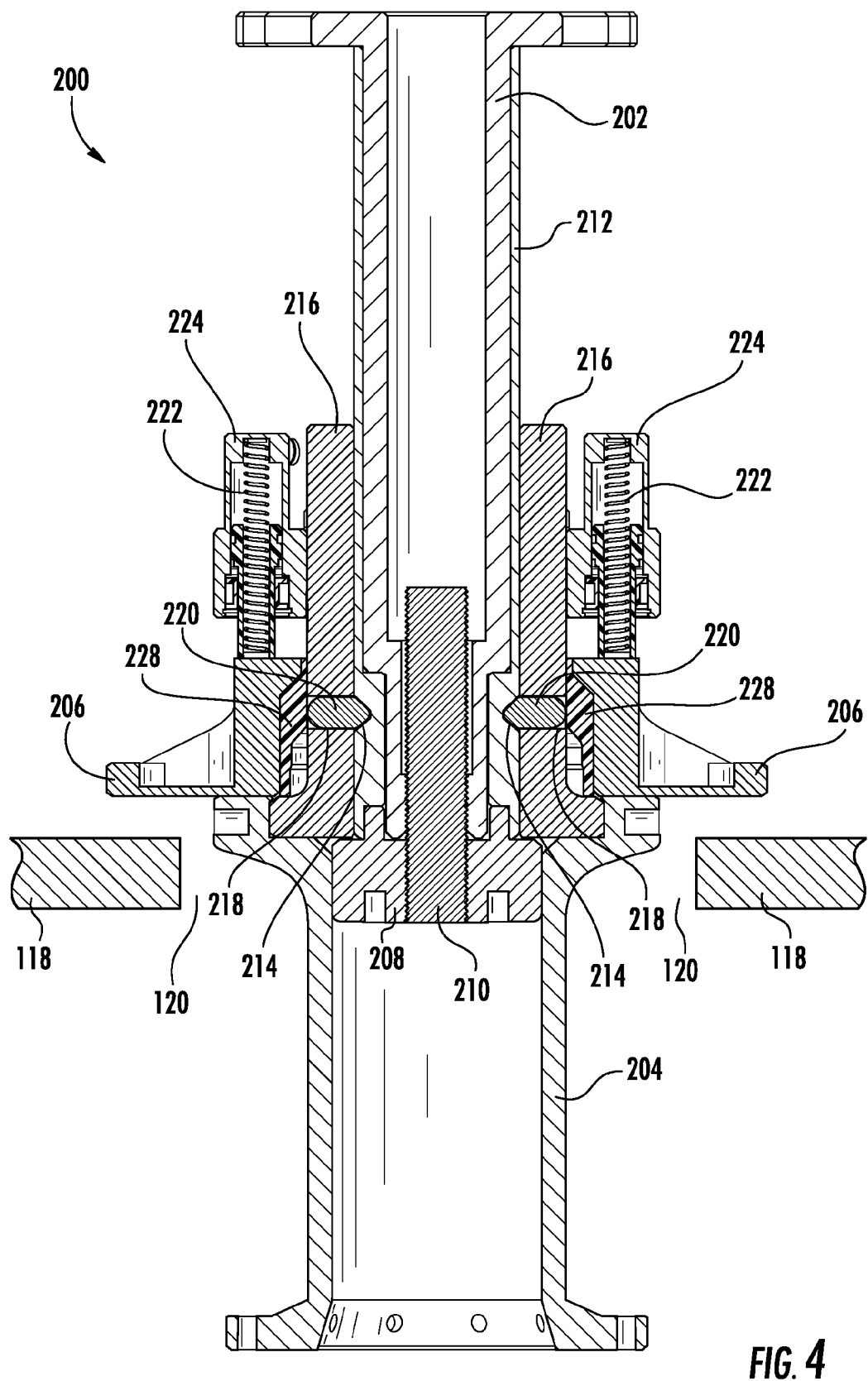
FIGS. 4, 5, and 6 depict cross-sectional view of the embodiment of the shaft decoupling system depicted in FIG. 1 at different instances, in accordance with the embodiments disclosed herein.
Figure 5:
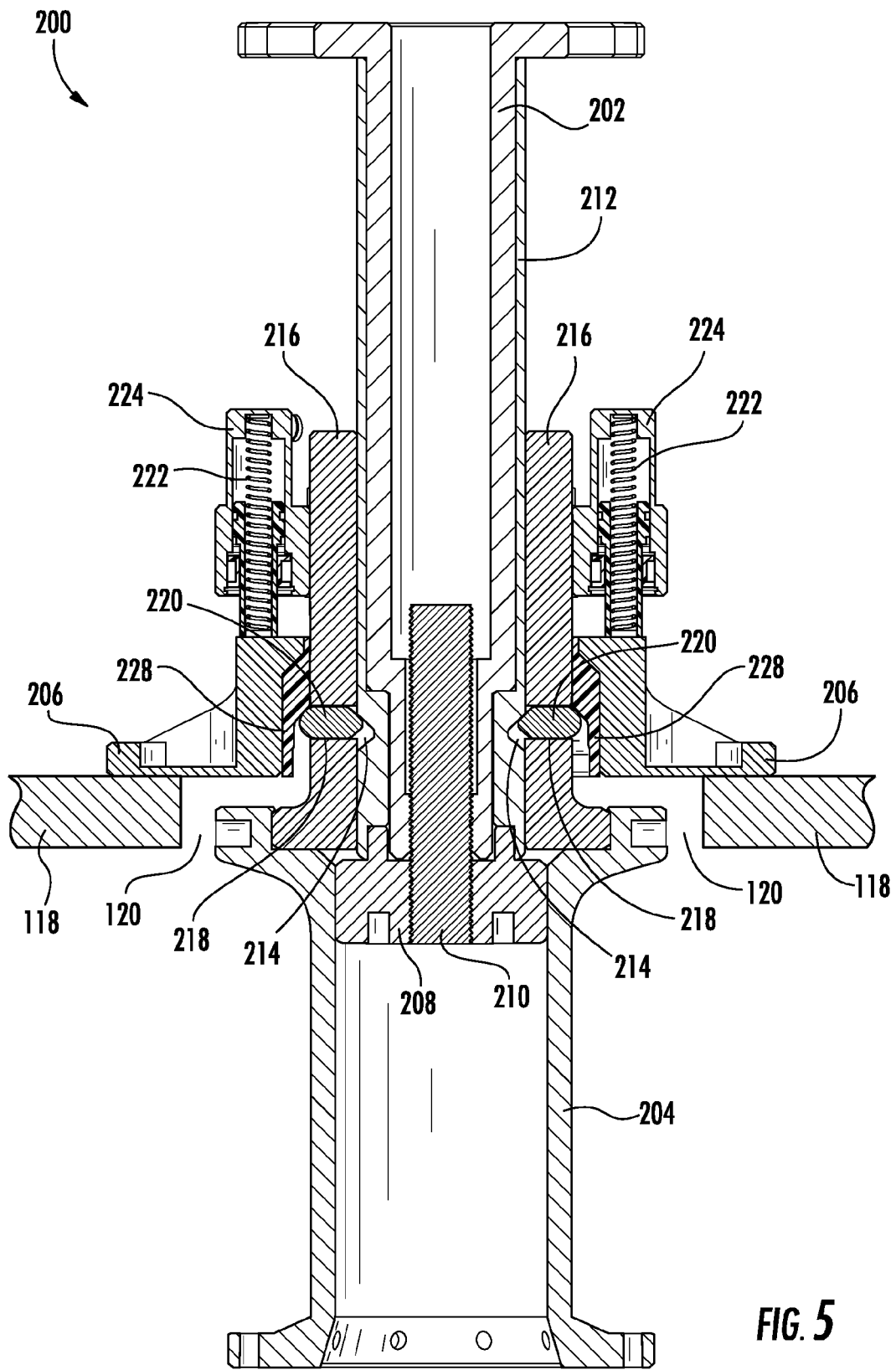
Figure 6:
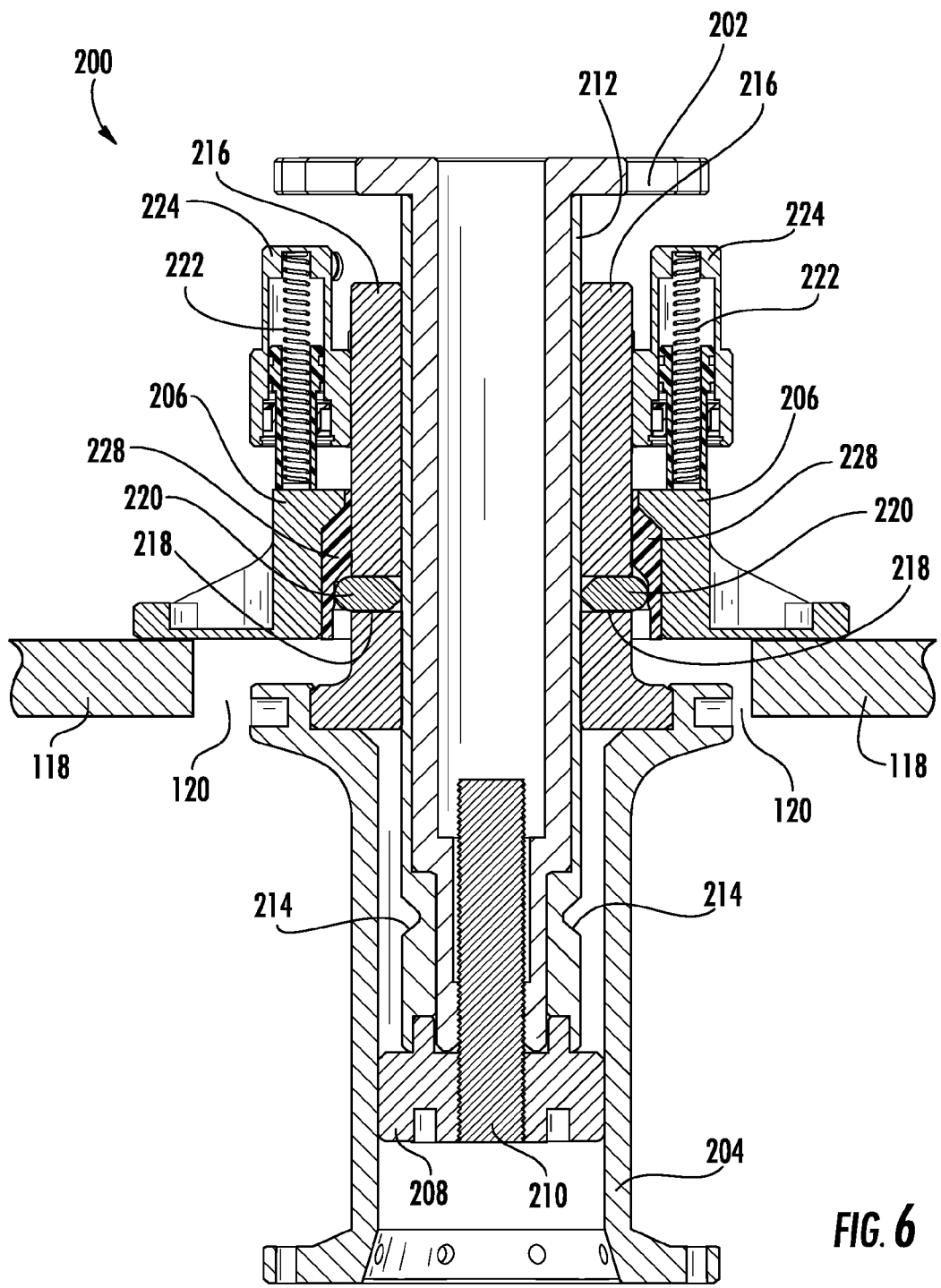

An embodiment of operation of the shaft decoupling system 200 is shown by three different instances depicted in FIGS. 4-6. As shown in FIGS. 4-6, the bearing retention collar 206 and the bearing contact surface 228 are fixedly coupled and located around the bearing retention collar 216. The bearing retention collar 206 and the bearing contact surface 228 are capable of moving with respect to the bearing retention collar 216. In the depicted embodiment, the downward movement of the bearing retention collar 206 is bounded by contact with the outer shaft 204 and the upward movement of the bearing retention collar 206 is resisted by the biasing force exerted by the biasing mechanism 222. The shaft decoupling system 200 is also shown with respect to the collar strike plate 118 with the outer shaft 204 located in the hole 120 of the collar strike plate 118.

In the instance shown in FIG. 4, the bearing retention collar 206 is biased toward a first position. In this particular embodiment, the bearing retention collar 206 is in contact with the outer shaft 204 in the first position. In the first position, the bearing contact surface 228 is in contact with the bearings 220 such that the bearings 220 are engaged into the bearing cavity 214. The engagement of the bearings 220 into the bearing cavity 214 prevents movement of the inner shaft 202 with respect to the outer shaft 204. Thus, while the bearing retention collar 206 is in the first position, any movement of the inner shaft 202 causes a respective movement of the outer shaft 204.

From the position depicted in FIG. 4, the shaft decoupling system 200 is moved downward. In some embodiments, such as in the embodiment depicted in FIG. 1, the shaft decoupling system 200 is moved downward by the actuator 102 fixedly coupled to the inner shaft 202. As the inner shaft 202 is moved downward, the bearing retention collar 206 contacts the collar strike plate 118. The collar strike plate 118 does not permit the bearing retention collar 206 to continue moving downward despite any downward force applied to the inner shaft 202 by the actuator 102. The continued downward force on the inner shaft 202 causes the bearing release collar 206 to move upward with respect to the biasing retention cap 224 against the force of the biasing mechanism 222, as shown in FIG. 5.

As the bearing retention collar 206 moves upward with respect to the biasing retention cap 224, the bearing contact surface 228 also moves with respect to the bearings 220. As shown in FIG. 5, the movement of the bearing contact surface 228 with respect to the bearings 220 allows the bearings to begin retracting from the bearing cavity 214. In the depicted embodiment, the inner faces of the bearings 220 are chamfered and the bearing cavity 214 has corresponding surfaces. The chamfered inner faces cause the continued downward movement of the inner shaft to force the bearings 220 out of the bearing cavity 214 as the bearing surface 228 permits the bearing to move away from the bearing cavity 214. In one example, the chamfered surfaces that engage the bearing cavity 214 are at angles of approximately 45°. In some embodiments, such as the one depicted in FIG. 5, the outer faces of the bearings 220 and the bearing surface 228 has corresponding surfaces. In some embodiments, the inner surfaces and outer surfaces of the bearings are chamfered, rounded, or any other shape.

From the position depicted in FIG. 5, the downward movement of the inner shaft 202 continues to the instance depicted in FIG. 6. In the instance depicted in FIG. 6, the bearing release collar 206 is located in a second position where the bearing contact surface 228 permits the bearings 220 to retract from the bearing cavity 214. When the bearing release collar 206 is in the second position and the bearings 220 are retraced from the bearing cavity 214, the inner shaft 202 is decoupled from the outer shaft 204 and the inner shaft 202 is permitted to move coaxially with respect to the outer shaft 204. Thus, the outer shaft 204 does not continue moving downward when the inner shaft 202 continues moving downward. In the instance shown in FIG. 6, the inner shaft 202 has continued downward with the guide 208 continuing downward through the inside of the outer shaft 204.

From the position depicted in FIG. 6, the inner shaft 202 is capable of being retracted upward with respect to the outer shaft 204 to a point at which the bearings 220 are permitted to engage the bearing cavity 214 and the bearing release collar 206 is no longer in contact with the collar strike plate 118. As the inner shaft 202 is retracted in this way, the bearing release collar 206 returns to the first position with the bearings 220 engaged into the bearing cavity 214, preventing respective movement of the inner shaft 202 with respect to the outer shaft 204. In the embodiment depicted in FIGS. 4-6, the outer diameter of the guide 208 is greater than the inner diameter of the bearing retention collar 216, which prevents the guide 208 from being retracted up through the bearing retention collar 216. This avoids any possibility of the guide 208 being retracted above the holes 218 that retain bearings 220, which would permit the bearings 220 to fall out of the holes 218 into the inside of the outer shaft 204.

Referring back to FIG. 1, the test system 100 with the shaft decoupling system 200 is capable of being used in a compression test without damaging the shear pin 106 that couples the actuator 102 to the driven shaft 104. To perform a test, a specimen is placed in the specimen testing area 110. A height of the collar strike plate 118 is selected based on a particular depth of compression during the compression test. In particular, the height of the collar strike plate is selected such that the desired depth of compression will be reached at the point that the inner shaft 202 of the shaft decoupling system 200 decouples from the outer shaft 204.

The compression test is carried out by the actuator 102 moving the driven shaft 104 downward such that the outer shaft 204 of the shaft decoupling system 200 moves through the hole 120 in the collar strike plate 118 and contacts the specimen. The actuator 102 continues moving the driven shaft 104 downward such that the outer shaft 204 compresses the specimen and the bearing release collar 206 contacts the collar strike plate 118. The bearing release collar 206 moves from its first position to its second position in response to contacting the collar strike plate 118, resulting in the inner shaft 202 being decoupled from the outer shaft 204. This allows the actuator 102 to move the inner shaft 202 at a constant rate through the point at which the outer shaft 204 decouples from the inner shaft 202. After the outer shaft 204 decouples from the inner shaft 202, the actuator 102 is capable of slowing to a stop before the guide bar 114 contacts the mechanical stops 124. This avoids the potential damage to the shear pin 106 by a sudden stop, while allowing the compression test to be performed at a constant rate until the desired depth of compression by the outer shaft 204 is reached. In this way, the shaft decoupling system 200 provides the ability to perform regular testing in a repeatable way with significantly less time and cost of repairing damage from breaking of the shear pin 106.

Figure 7:
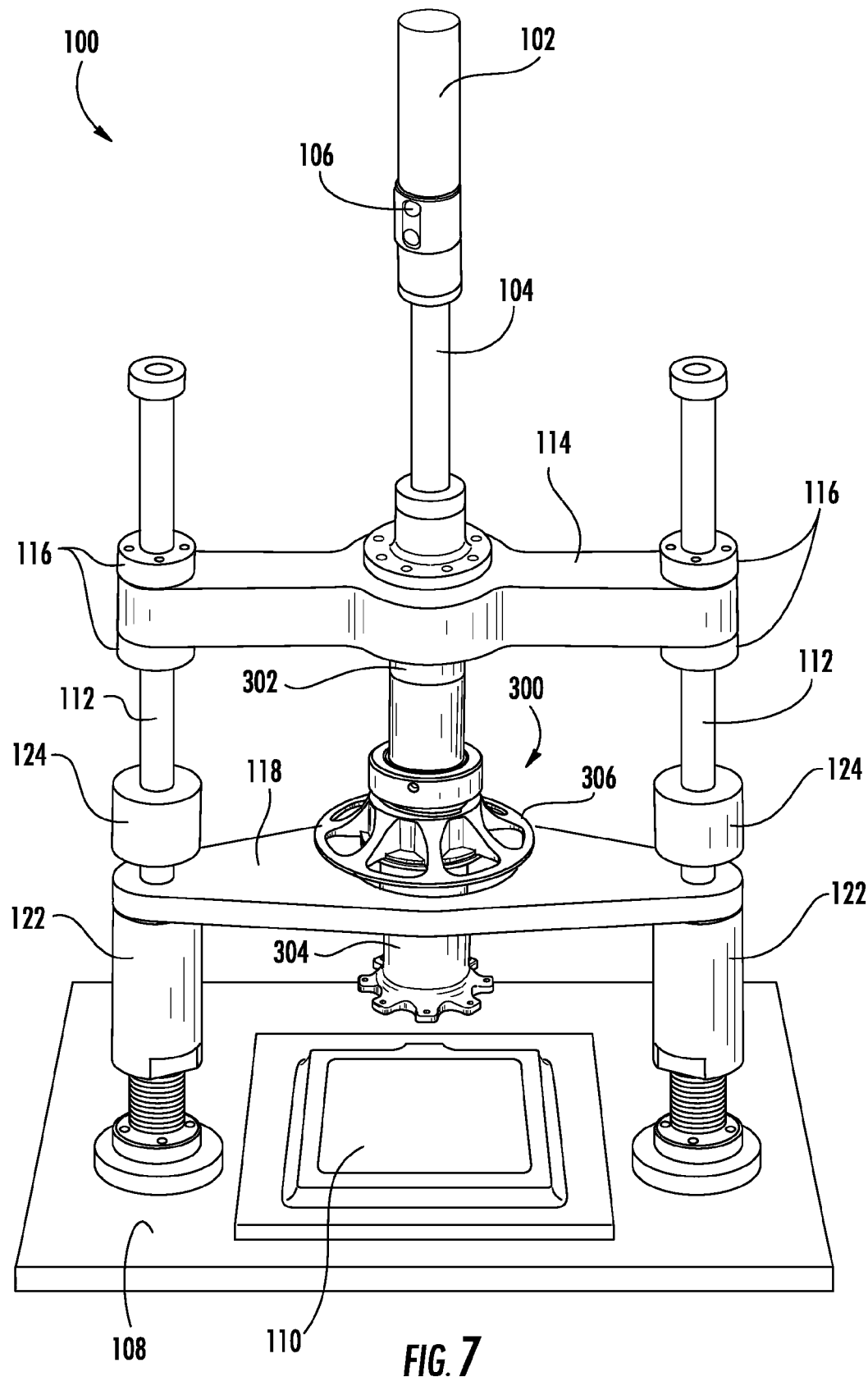
FIG. 7 depicts an embodiment of a test system with an embodiment of a shaft decoupling system, in accordance with the embodiments disclosed herein.
Figure 8:
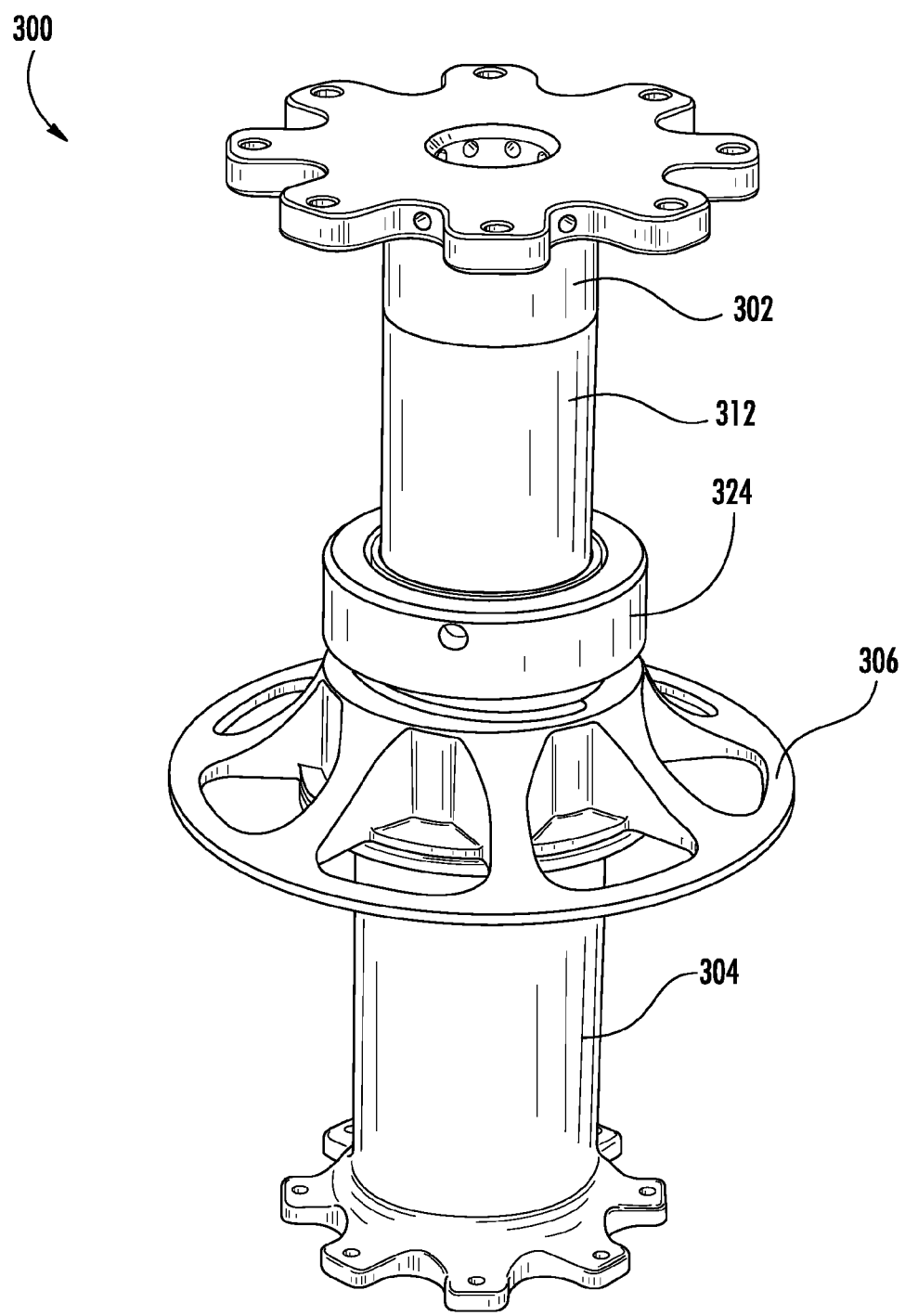
FIG. 8 depicts a perspective view of the embodiment of the shaft decoupling system depicted in FIG. 7, in accordance with the embodiments disclosed herein.
Figure 9:
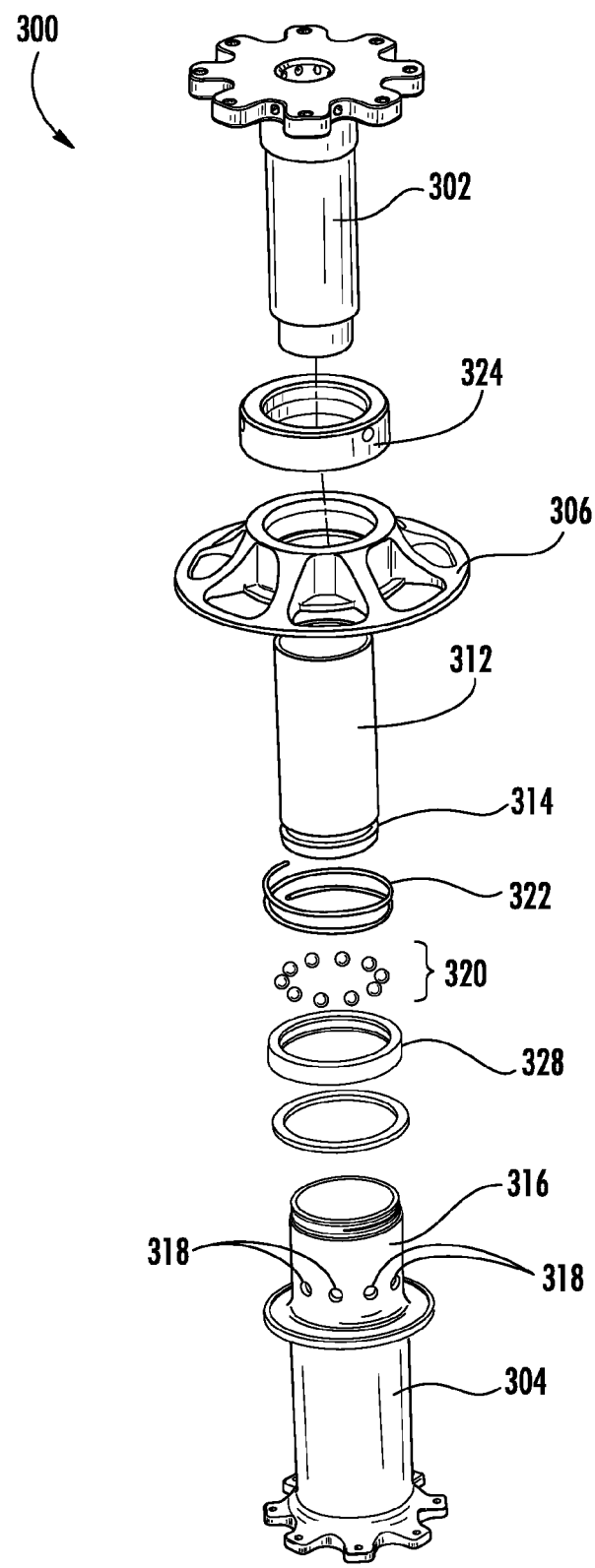
FIG. 9 depicts an exploded view of the embodiment of the shaft decoupling system depicted in FIG. 7, in accordance with the embodiments disclosed herein.

Another embodiment of the test system 100 with a different embodiment of a shaft decoupling system 300 is depicted in FIG. 7. The shaft decoupling system 300 is also depicted in greater detail in FIGS. 8 and 9. The shaft decoupling system 300 includes an inner shaft 302 that is configured to be fixedly coupled to the actuator 102. In the embodiment depicted in FIG. 7, the inner shaft 302 is fixedly coupled to the actuator 102 via the guide bar 114 and the driven shaft 104. The shaft decoupling system 300 also includes an outer shaft 304 and a bearing release collar 306. The outer shaft 304 is aligned coaxially with the inner shaft 302. As shown in FIG. 7, the outer shaft 304 is capable of passing through the hole 120 in the collar strike plate 118, but the bearing release collar 306 has a diameter larger than the hole 320 so that the bearing release collar 306 will contact the collar strike plate 118 if the shaft decoupling system 300 is moved downward to that point. This interaction of the bearing release collar 306 and the collar strike plate 118 will be further discussed below with respect to FIGS. 10-12.

In some embodiments, the shaft decoupling system 300 includes an outer sleeve 312 configured to be located around the outside of the inner shaft 302. In some embodiments, the outer sleeve 312 is configured to be fixedly coupled to the inner shaft 302, such as by press fit, by welding, by adhesive, or by any other means. The outer sleeve 312 includes a bearing cavity 314. In the embodiment depicted in FIGS. 9-12, the bearing cavity 314 is in the form of a groove around the perimeter of the outer sleeve 312.

In some embodiments, the shaft decoupling system 300 includes a bearing retention collar 316 formed integrally with the outer shaft 304. The bearing retention collar 316 includes bearing holes 318 configured to retain bearings 320. In the particular embodiment, the bearings 320 are ball bearings. In other embodiments, the bearings 320 include one or more of ball bearings, sleeve bearings, rod bearings, roller bearings, or any other type of bearings. The bearings 320 are configured to contact the bearing cavity 314 and to contact a bearing contact surface 328. In the embodiment depicted in FIGS. 9-12, the bearing contact surface 328 is separate from the bearing release collar 306 and configured to be fixedly coupled to the bearing contact surface 306. However, in other embodiments, the bearing contact surface 328 is formed as a portion of the bearing release collar 306.

The shaft decoupling system 300 includes a biasing mechanism 322 configured to bias the bearing release collar 306 to a first position. In the embodiment depicted in FIG. 9, the biasing mechanism 322 includes a single biasing mechanism. However, the biasing mechanism 322 may include any number of individual biasing mechanisms (e.g., more than one individual biasing mechanism). The shaft decoupling system 300 also includes a biasing retention cap 324. The biasing retention cap 324 is configured to be fixedly coupled to the bearing retention collar 316. In the embodiment depicted in FIGS. 9-12, the biasing retention cap 324 has internal threads that are configured to engage external threads on the bearing retention collar 316. In the depicted embodiment, the biasing retention cap 324 and the biasing mechanism 322 are configured to be located coaxially around at least one of a portion of the outer shaft 304 or the inner shaft 302.

Figure 10:
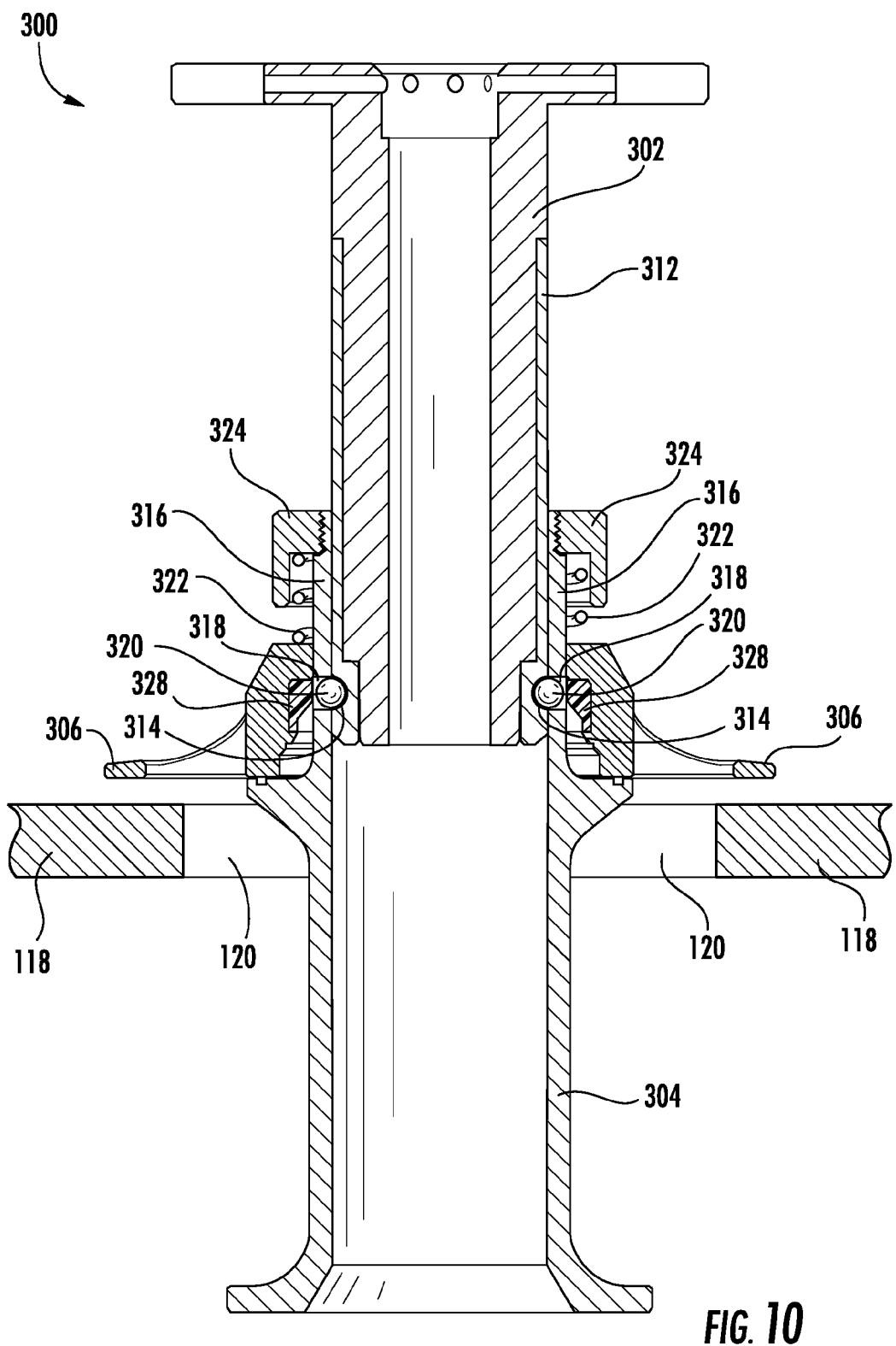
FIGS. 10, 11, and 12 depict cross-sectional view of the embodiment of the shaft decoupling system depicted in FIG. 7 at different instances, in accordance with the embodiments disclosed herein.
Figure 11:
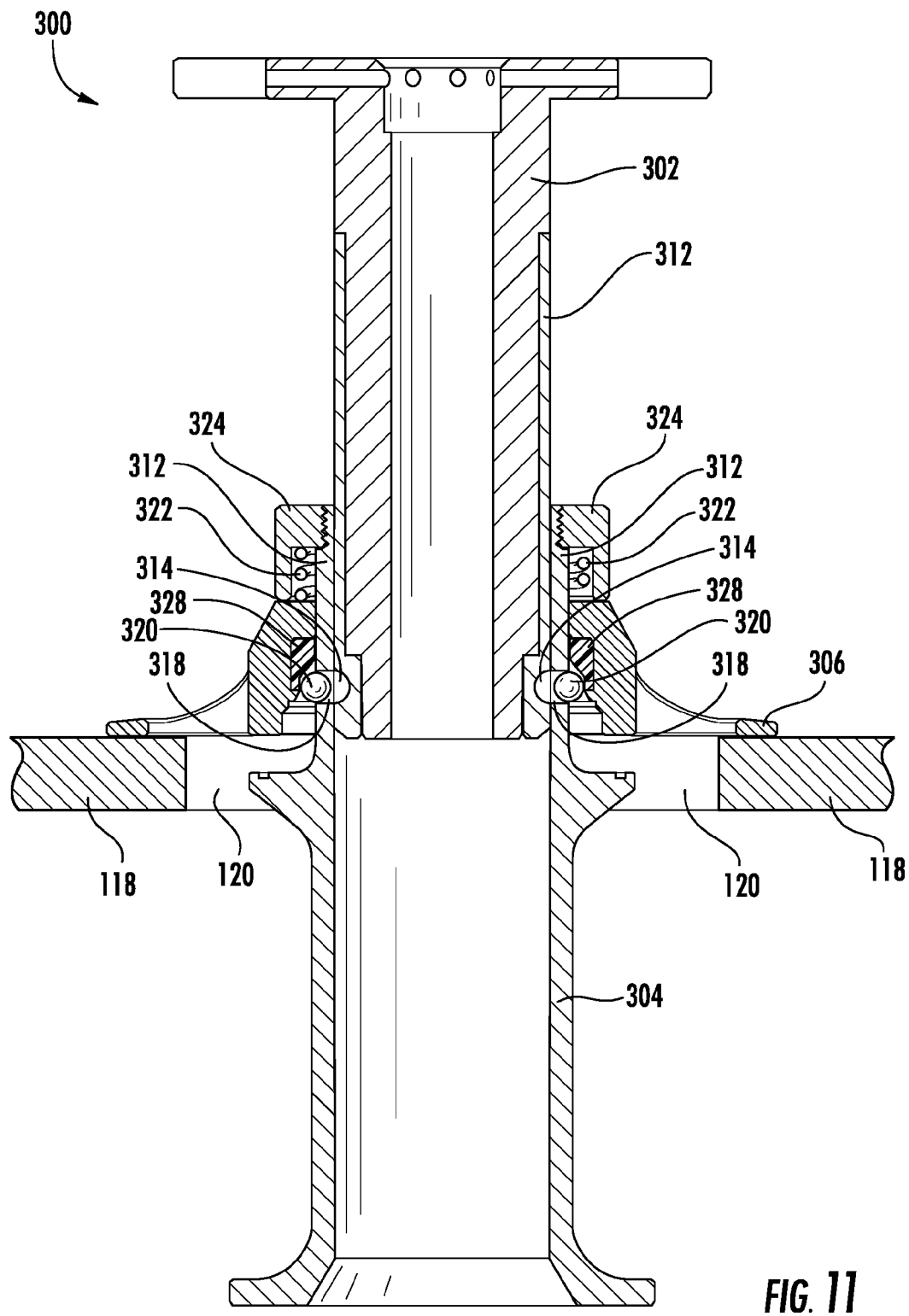
Figure 12:
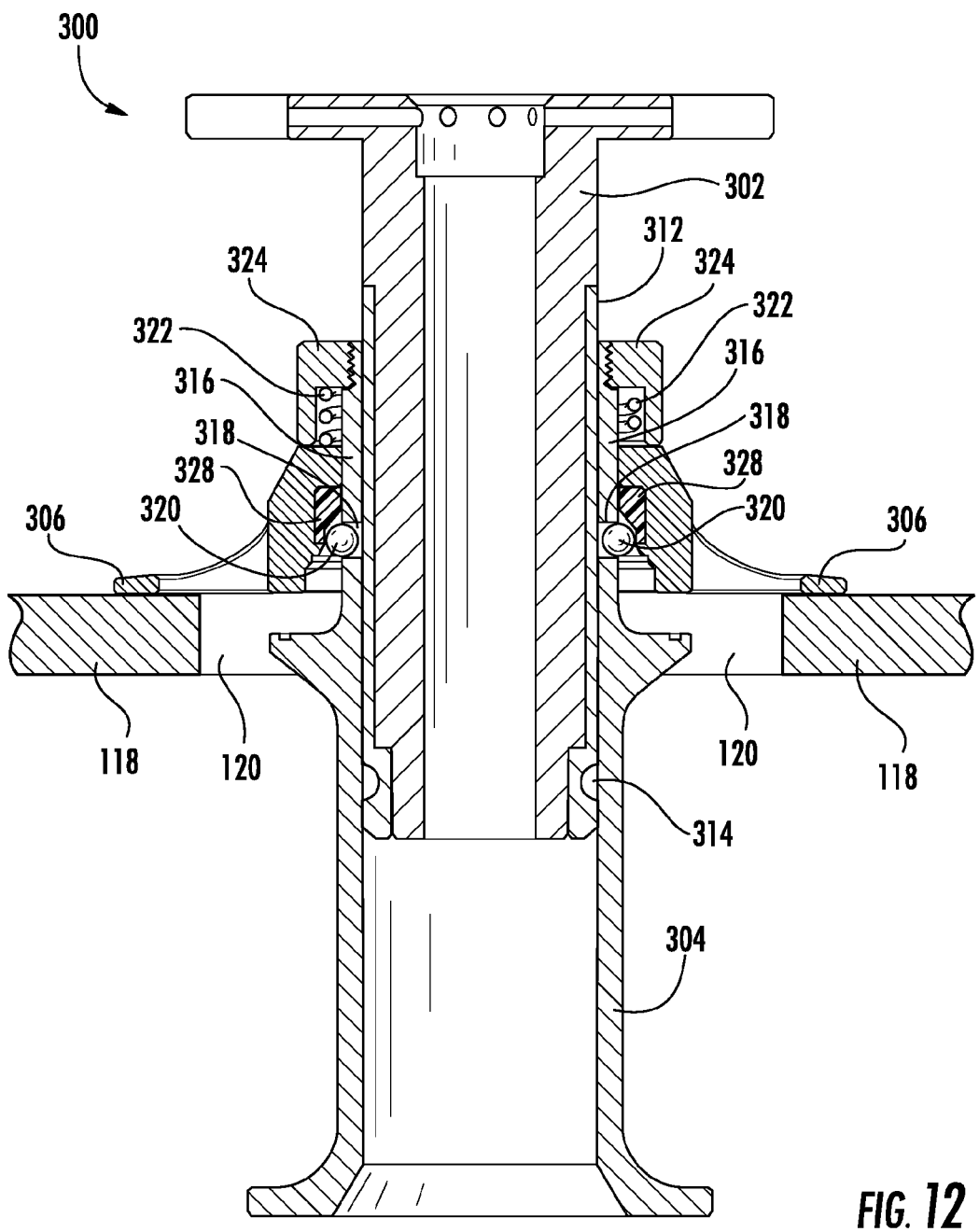

An embodiment of operation of the shaft decoupling system 300 is shown by three different instances depicted in FIGS. 10-12. As shown in FIGS. 10-12, the bearing retention collar 306 and the bearing contact surface 328 are fixedly coupled and located around the bearing retention collar 316. The bearing retention collar 306 and the bearing contact surface 328 are capable of moving together with respect to the bearing retention collar 316. In the depicted embodiment, the downward movement of the bearing retention collar 306 is bounded by contact with the outer shaft 304 and the upward movement of the bearing retention collar 306 is resisted by the biasing force exerted by the biasing mechanism 322. The shaft decoupling system 300 is also shown with respect to the collar strike plate 118 with the outer shaft 304 located in the hole 120 of the collar strike plate 118.

In the instance shown in FIG. 10, the bearing retention collar 306 is biased toward a first position. In this particular embodiment, the bearing retention collar 306 is in contact with the outer shaft 304 in the first position. With the bearing release collar 306 in the first position, the holes 318 align with the bearing cavity 314. Also, the bearing contact surface 328 is in contact with the bearings 320 such that the bearings 320 are engaged into the bearing cavity 314. The engagement of the bearings 320 into the bearing cavity 314 prevents movement of the inner shaft 302 with respect to the outer shaft 304. Thus, while the bearing retention collar 306 is in the first position, any movement of the inner shaft 302 causes a respective movement of the outer shaft 304.

From the position depicted in FIG. 10, the shaft decoupling system 300 is moved downward. In some embodiments, such as in the embodiment depicted in FIG. 7, the shaft decoupling system 300 is moved downward by the actuator 102 fixedly coupled to the inner shaft 302. As the inner shaft 302 is moved downward, the bearing retention collar 306 contacts the collar strike plate 118. The collar strike plate 118 does not permit the bearing retention collar 306 to continue moving downward despite any downward force applied to the inner shaft 302 by the actuator 102. The continued downward force on the inner shaft 302 causes the bearing release collar 306 to move upward with respect to the biasing retention cap 324 against the force of the biasing mechanism 322, as shown in FIG. 11.

As the bearing retention collar 306 moves upward with respect to the biasing retention cap 324, the bearing surface 318 also moves with respect to the bearings 320. As shown in FIG. 11, the movement of the bearing surface 318 with respect to the bearings 320 allows the bearings to begin retracting from the bearing cavity 314. The round surfaces of the ball bearings 320 cause the continued downward movement of the inner shaft to force the bearings 320 out of the bearing cavity 314 as the bearing surface 318 permits the bearing 320 to move away from the bearing cavity 314.

From the position depicted in FIG. 11, the downward movement of the inner shaft 302 continues to the instance depicted in FIG. 12. In the instance depicted in FIG. 12, the bearing release collar 306 is located in a second position where the bearings 320 are fully retracted from the bearing cavity 314 and the inner shaft 302 is permitted to move coaxially with respect to the outer shaft 304. When the bearing release collar 306 is in the second position, the inner shaft 302 is decoupled from the outer shaft 304 such the outer shaft 304 does not continue moving downward when the inner shaft 302 continues moving downward. In the instance shown in FIG. 12, the inner shaft 302 has continued downward through the inside of the outer shaft 304.

From the position depicted in FIG. 12, the inner shaft 302 is capable of being retracted upward with respect to the outer shaft 304 to a point at which the bearings 320 are permitted to engage the bearing cavity 314 and the bearing release collar 306 is no longer in contact with the collar strike plate 118. As the inner shaft 302 is retracted in this way, the bearing release collar 306 returns to the first position with the bearings 320 engaged into the bearing cavity 314, preventing respective movement of the inner shaft 302 with respect to the outer shaft 304.

Referring back to FIG. 7, the test system 100 with the shaft decoupling system 300 is capable of being used in a compression test without damaging the shear pin 106 that couples the actuator 102 to the driven shaft 104. To perform a test, a specimen is placed in the specimen testing area 110. A height of the collar strike plate 118 is selected based on a particular depth of compression during the compression test. In particular, the height of the collar strike plate is selected such that the desired depth of compression will be reached at the point that the inner shaft 302 of the shaft decoupling system 300 decouples from the outer shaft 304.

The compression test is carried out by the actuator 302 moving the driven shaft 104 downward such that the outer shaft 304 of the shaft decoupling system 300 moves through the hole 120 in the collar strike plate 118 and contacts the specimen. The actuator 102 continues moving the driven shaft 104 downward such that the outer shaft 304 compresses the specimen and the bearing release collar 306 contacts the collar strike plate 118. The bearing release collar 306 moves from its first position to its second position in response to contacting the collar strike plate 118, resulting in the inner shaft 302 being decoupled from the outer shaft 304. This allows the actuator 102 to move the inner shaft 302 at a constant rate through the point at which the outer shaft 304 decouples from the inner shaft 302. After the outer shaft 304 decouples from the inner shaft 302, the actuator 102 is capable of slowing to a stop before the guide bar 114 contacts the mechanical stops 124. This avoids the potential damage to the shear pin 106 by a sudden stop, while allowing the compression test to be performed at a constant rate until the desired depth of compression by the outer shaft 304 is reached. In this way, the shaft decoupling system 300 provides the ability to perform regular testing in a repeatable way with significantly less time and cost of repairing damage from breaking of the shear pin 106.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A shaft decoupling system, comprising:
   an inner shaft couplable to an actuator;
   an outer shaft aligned coaxially with the inner shaft;
   a bearing release collar biased toward a first position by a biasing mechanism and configured to be moved to a second position against a biasing force of the biasing mechanism in response to the bearing release collar contacting a collar strike plate as the actuator moves the shaft decoupling system;
   wherein, when the bearing release collar is in the first position, a bearing is held by the bearing release collar to prevent respective movement of the inner shaft and the outer shaft;
   wherein, when the bearing release collar is in the second position, the bearing release collar permits the bearing to retract such that the inner shaft is permitted to move coaxially with respect to the outer shaft; and
   wherein the collar strike plate is coupled to adjustable height components that are configured to be adjusted to set a distance from a base to the collar strike plate.

2. The shaft decoupling system of claim 1, wherein the bearing comprises a plurality of bearings having substantially linear inner and outer surfaces.

3. The shaft decoupling system of claim 2, further comprising:
   a bearing retention collar fixedly coupled to the outer shaft and configured to hold the plurality of bearings between the bearing release collar and the inner shaft.

4. The shaft decoupling system of claim 3, further comprising:
   a guide fastened to an end of the inner shaft such that the guide is located within the outer shaft.

5. The shaft decoupling system of claim 4, wherein the guide has an outer diameter that is larger than an inner diameter of the bearing retention collar.

6. The shaft decoupling system of claim 2, wherein the inner shaft has an outer sleeve that includes a plurality of flat surfaces.

7. The shaft decoupling system of claim 6, wherein the outer sleeve includes a bearing cavity on each of the plurality of flat surfaces.

8. The shaft decoupling system of claim 7, wherein the bearing cavity is a groove around a perimeter of the outer sleeve.

9. The shaft decoupling system of claim 1, further comprising:
   a biasing retention cap fixedly coupled to the outer shaft such that the biasing mechanism is retained between the biasing retention cap and the bearing retention collar.

10. The shaft decoupling system of claim 9, wherein the biasing retention cap and the biasing mechanism are located coaxially around at least one of a portion of the outer shaft and a portion of the inner shaft.

11. The shaft decoupling system of claim 9, wherein the biasing mechanism includes a plurality of biasing mechanisms and the biasing retention cap is configured to retain the plurality of biasing mechanisms between the biasing retention cap and the bearing retention collar.

12. The shaft decoupling system of claim 1, wherein the bearing comprises a plurality of bearings.

13. The shaft decoupling system of claim 12, wherein the plurality of bearings includes one or more of a ball bearing, a sleeve bearing, a rod bearing, or a roller bearing.

14. The shaft decoupling system of claim 12, wherein the outer shaft is coupled to a bearing retaining collar that comprises a plurality of holes configured to retain the 5 plurality of ball bearings.

15. The shaft decoupling system of claim 14, wherein the inner shaft comprises an outer sleeve that includes a bearing cavity configured to be aligned with the plurality of holes in the bearing retaining collar when the bearing release collar is in the first position.

16. A test system, comprising:
   a driven shaft couplable to an actuator;
   a shaft decoupling system comprising:
      an inner shaft coupled to the driven shaft,
      an outer shaft aligned coaxially with the inner shaft, and
      a bearing release collar biased toward a first position by a biasing mechanism and configured to be moved to a second position, wherein, when the bearing release collar is in the first position, a bearing is held by the bearing release collar to prevent respective movement of the inner shaft and the outer shaft, and wherein, when the bearing release collar is in the second position, the bearing release collar permits the bearing to retract such that the inner shaft is permitted to move coaxially with respect to the outer shaft;

a collar strike plate positioned above a testing area, the collar strike plate comprising a hole arranged such that, as the actuator moves the driven shaft and the shaft decoupling system, the outer shaft is permitted to pass through the hole and the bearing release collar contacts the collar strike plate and move the bearing release collar from the first position to the second position; and adjustable height components between a base of the test system and the collar strike plate, wherein the adjustable height components are configured to be adjusted to set a distance from the base to the collar strike plate.

17. The test system of claim 16, further comprising:
at least two guide rails extending through the adjustable adjustable height components and the collar strike plate.

18. The test system of claim 17, further comprising:
a guide bar fixedly coupled to the driven shaft and to the inner shaft, wherein the guide bar is configured to glide along the at least two guide rails as the actuator moves the driven shaft.

19. The test system of claim 16, further comprising the actuator.

20. The test system of claim 19, wherein the actuator and the driven shaft are coupled via a shear pin.

* * * * *